United States Patent [19]

Tomino et al.

[11] Patent Number: 4,732,886
[45] Date of Patent: Mar. 22, 1988

[54] HYDROGEN TREATING CATALYST FOR HYDRODESULFURIZATION-CRACKING OF MINERAL OIL

[75] Inventors: Takeshi Tomino; Mitsugu Yumoto, both of Ibaraki; Kinya Tawara, Saitama, all of Japan

[73] Assignee: Research Association for Residual Oil Processing, Tokyo, Japan

[21] Appl. No.: 932,417

[22] Filed: Nov. 20, 1986

Related U.S. Application Data

[63] Continuation-in-part of Ser. No. 745,111, Jun. 17, 1985, abandoned.

[30] Foreign Application Priority Data

Jun. 15, 1984 [JP]  Japan ................. 59-124025

[51] Int. Cl.$^4$ .................... B01J 21/04; B01J 23/88
[52] U.S. Cl. ................... 502/314; 502/315; 208/216 PP
[58] Field of Search ................ 502/315, 314; 208/216 PP

[56] References Cited

U.S. PATENT DOCUMENTS 3,730,879  5/1973  Christman et al. ............ 208/210
4,012,340  3/1977  Morimoto .................... 502/314
4,177,163  12/1979  Oleck et al. ............... 502/304 X
4,267,033  5/1981  Heck et al. ................ 208/216 PP Primary Examiner—Wm. J. Shine
Attorney, Agent, or Firm—Sughrue, Mion, Zinn, Macpeak, and Seas

[57] ABSTRACT

A hydrogen treating catalyst comprising alumina, 3 to 7% by weight of nickel calculating as NiO and 10 to 20% by weight of molybdenum calculating as $MoO_3$, which has a total pore volume of 0.55 to 1.0 ml/g, an average pore diameter of 50 to 250 Å, and factor P of 3 to 4, wherein the volume of pores having a diameter of larger than the average pore diameter+10 Å and smaller than the average pore diameter+500 Å is 10 to 30% of the total pore volume in catalyst pore distribution, wherein the factor P is represented by the following formula:

$$P = \overline{PD}/S$$

wherein $\overline{PD}$ represents an average pore diameter measured by a mercury porosimeter which is the pore diameter (Å) corresponding to the pressure at which ½ of the total pore volume is saturated with mercury, and S represents a proportion (%) of volume of pores in a range of $\overline{PD} \pm 5$ Å.

11 Claims, 2 Drawing Figures

HYDROGEN TREATING CATALYST FOR HYDRODESULFURIZATION-CRACKING OF MINERAL OIL

This application is a continuation-in-part application of Ser. No. 745,111, filed June 17, 1985.

FIELD OF THE INVENTION

The present invention relates to a reaction process in which a hydrodesulfurization reaction and a hydrocracking reaction of heavy mineral oil, particularly, residual oil, proceed at the same time, and to a catalyst for the same.

BACKGROUND OF THE INVENTION

With respect to the trend in demand of petroleum products, the demand of middle fractions such as kerosine, diesel fuel, light residual fuel oil, etc., has increased, and, on the other hand, the demand of heavy oils such as heavier residual fuel oil, etc., has remarkably decreased. This trend is supposed to continue for a long time. Since the petroleum products are those obtained in series and amounts of each fraction depend upon the kind of crude petroleum, it is difficult to control production of each product so as to agree with the demand. On the other hand, in view of the supply of the crude petroleum, the ratio of heavy crude petroleum to the whole crude petroleum has a tendency to increase year by year. Considering such a demand structure, namely, an increase of heavy crude petroleum and deficiency of middle fractions, it has been desired to establish a hydrocracking technique for producing middle fractions having good quality from residual oil in a high selectivity. Further, because hydrogen treated residual oil produced by removing light fractions from a hydrocracking product is used mainly as fuel, it is necessary that sulfur compounds are removed from it. In this case, it is of course necessary to have a long period of continuous operation (catalyst life). Accordingly, it has been greatly desired to develop a hydrogen treating catalyst having long catalyst life by which hydrocracking and hydrodesulfurization of heavy mineral oil occur at the same time.

Hitherto, catalysts which cause hydrodesulfurization, hydrodemetallization or hydrocracking of heavy oil such as residual oil have been known. Catalysts showing such function which have a specific pore size distribution have been described in Japanese Patent Publication Nos. 38142/70, 38143/70 (corresponding to U.S. Pat. No. 3,383,301), 20911/71, 44001/72, 33321/74 (corresponding to U.S. Pat. No. 3,766,057), 41641/76 (corresponding to U.S. Pat. No. 3,843,509), 10942/79, 37163/79, 95/80, 44795/80, 44796/80 (corresponding to U.S. Pat. No. 3,730,879), 52620/81 and 31457/82 and Japanese Patent Application (OPI) No. 27036/80 (the term "OPI" as used herein refers to a "published unexamined Japnese patent application open to public inspection"). However, catalysts described in the above described Japanese Patent Publication Nos. 38142/70, 38143/70, 20911/71, 41641/76, 44795/80 and 44796/80 have a fault in that the catalyst life is reduced when carrying out hydrodesulfurization and hydrocracking at the same time. The reason for this is believed to be that the catalysts have a small total pore volume and an unsuitable pore size distribution. Catalysts described in Japanese Patent Publication Nos. 33321/74, 10942/79 and 52620/81 and Japanese Patent Application (OPI) No. 27036/80 also have a fault in that the catalyst life is reduced when carrying out hydrodesulfurization and hydrocracking at the same time. The reason for this is believed to be that the catalysts have an unsuitable pore size distribution. Catalysts described in Japanese Patent Publication Nos. 37163/79 and 31457/82 have a fault with respect to the catalyst life, because those having a suitable pore volume are not suitable in the pore size distribution and those having a suitable pore size distribution are not suitable in the pore volume. Catalysts described in the above described Japanese Patent Publication Nos. 38143/70, 44001/72, 33321/74, 10942/79, 95/80, 44795/80, 44796/80, 52620/81 and 31457/82 and Japanese Patent Application (OPI) No. 27036/80 are essentially catalysts for hydrodesulfurization, and the catalyst life becomes short, if hydrocracking is carried out at the same time as hydrodesulfurization. Catalysts described in, for example, examples in Japanese Patent Publication Nos. 33321/74, 44795/80 and 31457/82 do not contain nickel as a hydrogenating metal component and are not suitable for carrying out hydrodesulfurization and hydrocracking at the same time. Catalysts described in Japanese Patent Publication No. 37163/79 are catalysts for hydrodemetallization, and the catalyst life becomes short when hydrodesulfurization and hydrocracking are carried out at the same time.

Namely, hitherto, catalysts for desulfurization, catalysts for demetallization and catalysts for hydrocracking have been used, respectively, as hydrogen treating catalysts. As the catalysts for desulfurization and the catalysts for demetallization, alumina base-containing catalysts are mainly used. As the catalysts for hydrocracking, crystalline or amorphous silica-alumina base-containing catalysts have been generally used or studied, because strong acidity is required as compared with the catalysts for desulfurization and the catalysts for demetallization. However, these prior hydrogen treating catalysts have faults in that the hydrocracking activity is insufficient, the hydrodesulfurization activity is insufficient or the catalyst life is insufficient, because these prior catalysts have substantially a single function, i.e., any one of hydrocracking, hydrodesulfurization, or hydrodemetallization function. In other words, the prior catalysts for desulfurization have been developed concentrating on only desulfurization activity and designed so as to have a high desulfurization activity at a comparatively low temperature, and, consequently, they exhibit a low cracking rate for heavy mineral oil. Further, in the case that these catalysts are allowed to react at a temperature range at which the cracking rate becomes high, namely, at a high temperature range capable of causing hydrocracking at an acid site of alumina, desulfurization activity rapidly reduces by rapid deposition of metal, coke, etc., to shorten the catalyst life. Accordingly, they are not suitable for the reaction process for such a purpose.

On the other hand, with respect to reaction temperature, there are problems of generation of sludge in the reaction products, congelation of the catalyst particles, limitation of reaction temperature in designing the apparatus, and the like, and it is impossible to increase the reaction temperature without any restriction. Further, the silica-alumina base-containing catalysts have a fault of having low desulfurization activity. Therefore, in the case of carrying out hydrocracking heavy oil having a high sulfur content, it is necessary to carry out two stage processing wherein desulfurization reaction is conducted in the first step and, thereafter, hydrocracking reaction is conducted in the second step.

SUMMARY OF THE INVENTION

As a result of earnest studies, the present inventors have found a hydrogen treating catalyst for heavy mineral oil wherein the desulfurization reaction and hydrocracking reaction can proceed at the same time by using an alumina base-containing catalyst with strictly controlling catalyst properties thereof, by which desulfurization activity under a reaction condition at which the cracking rate becomes high to some degree is in an industrially required desulfurization level, and a stabilized operation can be carried out for a long period of time. Thus, the present invention has been established.

Accordingly, a chief object of the present invention is to provide a hydrogen treating catalyst having high catalytic activity.

Another object of the present invention is to provide a hydrogen treating catalyst having both high hydrodesulfurization activity and high hydrocracking activity as well as long catalyst life.

A further object of the present invention is to provide a hydrogen treating process for heavy mineral oil which comprises using a hydrogen treating catalyst having both high hydrodesulfurization activity and high hydrocracking activity as well as long catalyst life.

Namely, the present invention is a hydrogen treating catalyst comprising alumina, about 3 to 7% by weight of nickel calculating as NiO based on the total catalyst weight and about 10 to 20% by weight of molybdenum calculating as $MoO_3$ based on the total catalyst weight, which has a total pore volume of about 0.55 to 1.0 ml/g, an average pore diameter of about 50 to 250 Å, and factor P of about 3 to 4, wherein the volume of pores having a diameter of larger than the average pore diameter $+10$ Å and smaller than the average pore diameter $+500$ Å is about 10 to 30% of the total pore volume in catalyst pore distribution, wherein the factor P is represented by the following formula:

$$P = \overline{PD}/S$$

wherein $\overline{PD}$ represents an average pore diameter measured by a mercury porosimeter which is the pore diameter (Å) corresponding to the pressure at which ½ of the total pore volume is saturated with mercury, and S represents a proportion (%) of volume of pores in a range of $\overline{PD} \pm 5$ Å based on the total pore volume.

An embodiment of the present invention is a process for hydrodesulfurization-cracking of heavy mineral oil which comprises bringing heavy mineral oil in contact with the above described hydrogen treating catalyst at high temperature under pressure in the presence of hydrogen, by which hydrodesulfurization and hydrocracking of the heavy mineral oil are allowed to proceed at the same time.

BRIEF DESCRIPTION OF THE DRAWING

The abscissa represents time on stream (day), and the ordinate represents reaction temperature (°C.) necessary to attain, at the same time, a desulfurization rate of above a certain value and a cracking rate of above a certain value, which is shown as the difference from a standard temperature (360° C. in the case of FIG. 1). In FIG. 1, the restriction temperature means a boundary temperature at which operation is in danger of impossibility by congelation of the catalyst particles (395° C. in the case of FIG. 1). In FIG. 2, the restriction temperature is 410° C.

DETAILED DESCRIPTION OF THE INVENTION

Figure 1:
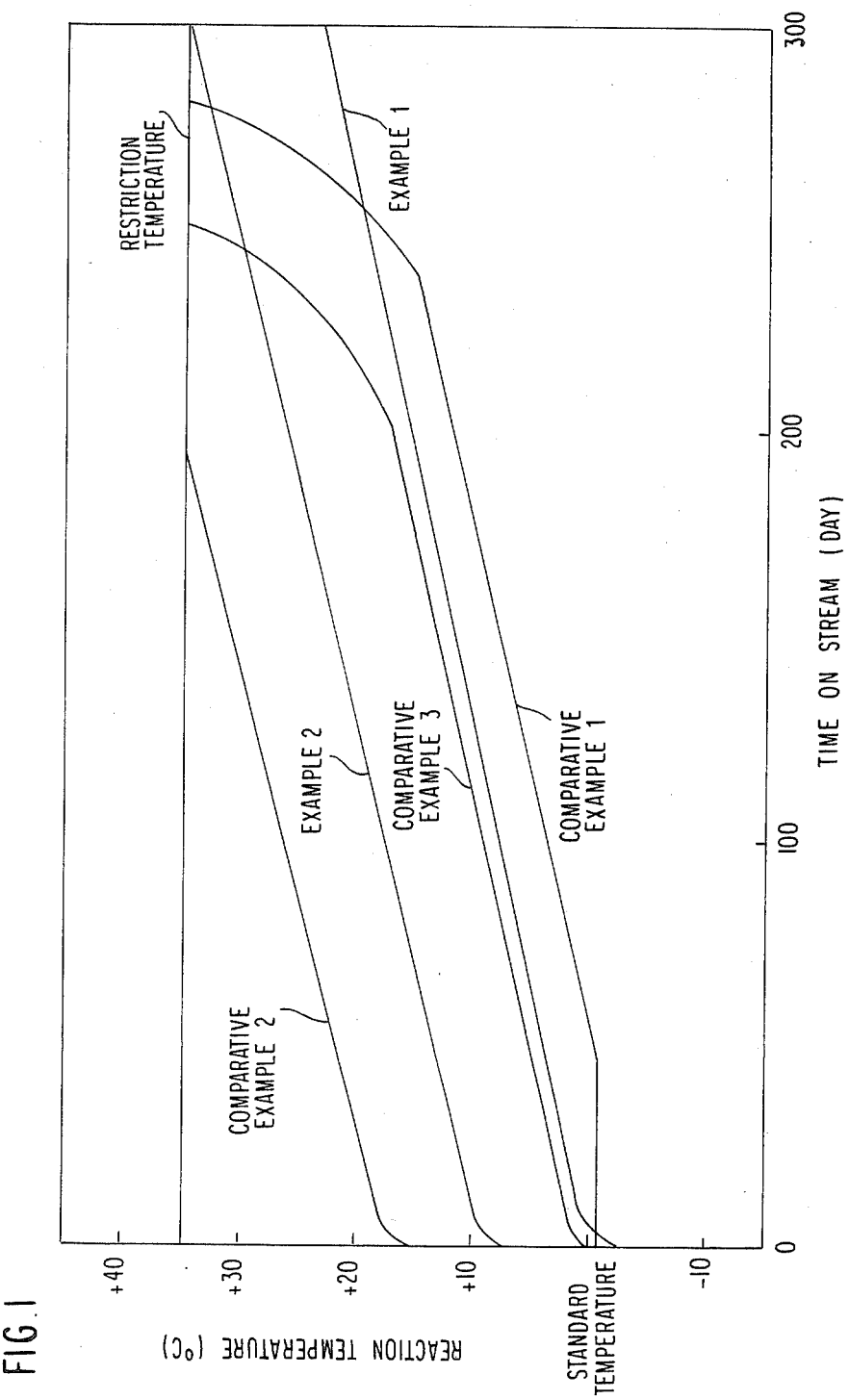
FIG. 1 and FIG. 2 are graphs showing relation of reaction temperature to the number of days for passing oil, i.e., time on stream (day) in examples, comparative examples and reference example of the present invention.

Feed oil to be processed by the hydrogen treating process of the present invention is heavy mineral oil, particularly, residual oil, for example, mineral hydrocarbon oil containing at least about 50% by weight, particularly, at least about 70% by weight of residual oil fractions boiling above 343° C. Examples of these include crude petroleum, topped crude oil, atmospheric pressure or vacuum distillation residual oil of crude petroleum and topped crude oil, fuel oil, and high boiling point fractions obtained from oil sand or oil shale. These heavy mineral oils contain large quantities of impurities such as sulfur, heavy metal, asphaltene, etc., and generally have a sulfur content of about 0.5 to 8% by weight, a metal content of about 1 to 500 ppm by weight and an asphaltene content of about 0.1 to 10% by weight. The feed oil may be heavy mineral oil which was previously processed by such as hydrodeasphaltene, denitrogenation or demetallization processing, etc. Distillate oil fractions which do not substantially contain asphaltene and metal, for example, gas oil or reduced pressure distillate oil can be processed. Sulfur content of the distillate oil fractions is generally about 0.5 to 8% by weight.

The catalyst used for hydrogen treating of these heavy mineral oils comprises about 3 to 7% by weight, preferably about 3.5 to 6% by weight, of nickel calculating as NiO based on the total catalyst weight, and about 10 to 20% by weight, preferably about 11 to 17% by weight, of molybdenum calculating as $MoO_3$ based on the total catalyst weight supported on an alumina carrier, and has a total pore volume of about 0.55 to 1.0 ml/g, preferably about 0.55 to 0.75 ml/g, an average pore diameter of about 50 to 250 Å, preferably about 50 to 220 Å, particularly about 50 to 200 Å, and factor P of about 3 to 4, preferably about 3.0 to 3.8, wherein the volume of pores having a diameter of larger than the average pore diameter $+10$ Å and smaller than the average pore diameter $+500$ Å is about 10 to 30%, preferably about 10 to 25%, more preferably about 10 to 20% of the total pore volume in catalyst pore distribution. The carrier of this catalyst preferably consists essentially of alumina, and hydrogenation metal component preferably consists essentially of nickel and molybdenum.

The term "total pore volume" of a catalyst used in this invention means a value measured at 4,225 kg/cm²·G (60,000 psig) by a mercury porosimeter. Because it is impossible to measure volume of the whole catalyst pores being in existence, a value of pore volume measured at 4,225 kg/cm²·G is regarded s the total pore volume. The average pore diameter ($\overline{PD}$), the proportion (%) of volume of pores in a range of $\overline{PD} - 5$ Å to $\overline{PD} + 5$ Å (S) and the volume of pores in a range of $\overline{PD} + 10$ Å to $\overline{PD} + 500$ Å are obtained in the manner described below. Namely, a relationship between pressure of the mercury porosimeter and absorbed amount of mercury by the catalyst is determined in a range of 0 to 4,225 kg/cm²·G, and $\overline{PD}$ is determined from the pressure at which ½ of the absorbed amount at 4,225 kg/cm²·G is absorbed. Then, absorbed amounts of mercury at pressures corresponding to $\overline{PD}+b\ 5$ Å, $\overline{PD}+5$ Å, $\overline{PD}+10$ Å and $\overline{PD}+500$ Å are determined. The relationship between the pressure of the mercury porosimeter and the diameter of pores is already known (contact angle of mercury is regarded as 130° and surface tension is regarded as 470 dynes/cm).

If carriers containing silicon such as silica-alumina or silica-magnesia are used as the carriers, the desulfurization activity of the catalyst is low and catalyst life becomes short in the case of carrying out hydrodesulfurization-cracking of the present invention. Catalysts containing both nickel and molybdenum as hydrogenation metal components are good in desulfurization activity, cracking activity and stability of activity. However, in catalysts which do not contain both nickel and molybdenum, desulfurization activity, cracking activity or stability of activity becomes low. If the content of hydrogenation metal components in the catalyst is too low, the effect is not shown. If it is too large, the catalyst pores are blockaded which changes the properties of the catalyst. If the total pore volume in the catalyst is too small, the catalyst life becomes short. If it is too large, the bulk density of the catalyst becomes small and the strength of the catalyst becomes low and preparation of the catalyst becomes difficult. The factor P of the catalyst is a measure of the sharpness of the pore size distribution relative to the average pore diameter. If the value of factor P is too small or too large, the catalyst life becomes short and hydrocracking activity or hydrodesulfurization activity beccmes low. If the average pore diameter of the catalyst is too small, the catalyst is unsuitable for processing heavy mineral oil, and if the average pore diameter is too large, desulfurization activity is reduced. If a proportion of the volume of pores having a diameter of larger than the average pore diameter $+10$ Å and smaller than the average pore diameter $+500$ Å based on the total pore volume is too small, the catalyst life is short and, particularly, the required temperature rapidly increases in the later stage of the reaction.

The above described catalysts can be prepared by conventional processes. The alumina carrier can be prepared by neutralizing an aluminum salt such as aluminum sulfate or aluminum nitrate with a base such as ammonia, or by neutralizing aluminate such as sodium aluminate with an acidic aluminum salt or acid, and processing the formed gel by conventional processes such as washing, aging, molding, drying and calcining, etc. In order to obtain a catalyst having the desired pore size distribution and the desired pore volume, pH, concentration, temperature or rate of addition of a precipitant (or neutralizing agent) in the case of producing the carrier gel by adding the precipitant; pH, concentration or temperature of the system to which the precipitant is added; or pH, temperature or aging time of the system after addition of the precipitant may be controlled. Generally, growth of colloid grains is accelerated by increasing pH in the alkaline range in the case of formation of precipitates, by which the diameter and the volume of pores of the resultant catalyst become large. If the aging time becomes longer, the volume of pores and the average pore diameter become larger and the pore size distribution becomes sharper. When the molding pressure or the molding rate of the carrier (or carrier gel) or a mixture obtained by kneading the carrier with hydrogenation metal components is controlled, properties of the resultant catalyst, such as pore size distribution and pore volume, etc., can be controlled. Application of nickel and molybdenum components to the alumina carrier (or alumina gel) can be carried out by conventional processes. For example, the hydrogenation metal components can be deposited on the carrier by bringing the carrier in contact with the solution containing the hydrogenation metal components, for exanple, by immersing the carrier in the solution containing the hydrogenation metal components, by kneading the carrier with the above solution, by dropping the solution on the carrier, or by adding a precipitant for the hydrogenation metal components while immersing the carrier in the solution to deposit the hydrogenation metal component on the carrier.

Any of nickel or molybdenum may be allowed to deposit first, or both of them may be allowed to deposit simultaneously. As nickel compounds capable of being used for the solution, there are, for example, nitrate, sulfate, fluoride, chloride, bromide, acetate, carbonate, phosphate, etc., of nickel.

As molybdenum compounds capable of being used for the solution, there are, for example, ammonium paramolybdate, molybdic acid, ammonium molybdate, ammonium phosphomolybdate, phosphomolybdic acid, etc.

After processing as described above, it is preferred to carry out molding, drying and calcining by the conventional methods. Drying is preferably carried out generally by placing the catalyst at room temperature to about 150° C., particularly about 100° to 120° C. for about 5 hours or more, particularly about 12 to 24 hours. Calcining is preferably carried out by placing the catalyst at about 350° to 600° C., particularly about 400° to 550° C. for about 3 hours or more, particularly about 12 to 24 hours. Drying and calcining of the alumina carrier may be carried out under the above described conditions.

After calcination of the above described catalyst composition, a greater part of the hydrogenation metal components in the catalyst is believed to convert into oxides or, partially, into the elemental state. When the catalyst is previously sulfurized prior to using it for hydrogenation treating of heavy mineral oil, a greater part of the hydrogenation metal components becomes sulfides, and a part or all of the hydrogenation metal components becomes sulfides by sulfur components in the mineral oil during hydrogen treating.

According to the present invention, hydrodesulfurization and hydrocracking can be carried out at the same time for a long time by hydrogen treating of the heavy mineral oil using the above described catalyst. The reactions can be carried out under the same conditions as when using the prior hydrogen treating catalyst for heavy mineral oil. Preferred reaction conditions include a reaction temperature of about 330° to 450° C., particularly about 350° to 420° C., most preferably about 360° to 400° C., a hydrogen partial pressure of about 80 to 200 kg/cm², particularly about 90 to 150 kg/cm², a liquid hourly space velocity of about 0.1 to 5 hr$^{-1}$, particularly about 0.1 to 0.5 hr$^{-1}$, and a feed ratio of hydrogen to feed oil (liquid) of about 500 to 2,800 Nl/l. Desulfurization rate and cracking rate particularly depend upon reaction temperature and liquid hourly space velocity. When the amount of the oil passing is constant, the two rates depend upon the reaction temperature. Therefore, the desulfurization rate and the cracking rate can be made to be a desired level by controlling mainly the reaction temperature and the liquid hourly space velocity. A desirable desulfurization rate is about 80% or more and, particularly, about 80 to 97%, and a preferable cracking rate (reduction rate of fractions having a boiling point of 343° C. or more under normal pressure in the feed oil) occurring simultaneously with desulfurization is about 10% or rore, particularly about 10 to 40%, and most preferably about 10 to 20%. Prior to processing of the heavy mineral oil, the catalyst may be previously sulfurized by passing a hydrogen sulfide gas or a sulfur-containing oil such as kerosine or gas oil through the catalyst bed. The reactions can be carried out by conventional processes, for example, by passing heavy mineral oil and hydrogen as a cocurrent downstream as a cocurrent up-stream through a fixed bed filled with the catalyst, or by passing the heavy mineral oil and hydrogen as a cocurrent up-stream through a fluidized bed or ebullated bed of the catalyst.

As described above, according to the present invention, using an alumina base-containing catalyst with strictly controlled properties thereof, desulfurization reaction and hydrocracking reaction are allowed to proceed at the same time, by which desulfurization and cracking of the heavy mineral oil can be stably carried out for a long time.

In the following, the present invention is illustrated with reference to non-limiting examples.

EXAMPLES 1 AND 2

Inspections of catalysts used in Examples 1 and 2 are shown in Table 1. Feed oil and hydrogen were passed as a cocurrent down-stream through a fixed catalyst bed. Experimental conditions included an amount of the catalyst used of 250 ml, a pressure of 100 kg/cm$^2$·G, a liquid hourly space velocity of 0.3 hr$^{-1}$, a ratio of hydrogen/feed oil of 1,000 Nl/l, and a temperature of 350° C. to 410° C., and atmospheric pressure distillation residual oil of Arabian light crude oil was used as the feed oil. Inspections of the feed stock are shown in Table 2. As the reaction process, a process wherein reduction of catalytic activity was supplemented by raising the reaction temperature so that the sulfur content of the residual oil fraction boiling above 343° C. (650° F.) (343° C.+) in the reaction product was 0.3% by weight or less and the cracking rate, i.e., the reduction rate of the residual oil fraction (343° C.+) in the feed oil by hydrocracking was 12% by weight or more was adopted. Catalysts A and B used in Examples 1 and 2 were catalysts of the present invention. Variation of the reaction temperature in the case of carrying out the above described reaction is shown in FIG. 1. In both of Example 1 (Catalyst A) and Example 2 (Catalyst B), stable operation could be carried out for 300 days or more. Namely, in the case of using Catalysts A and B, the time elapsed was 300 days or more until the required reaction temperature reached a restriction temperature (boundary temperature at which operation was in danger of impossibility by congelation of the catalyst particles; the restriction temperature in these experiments was 395° C.). As described above, it was understood that Catalysts A and B were suitable for reaction conditions of the present invention (for keeping the desired desulfurization rate and the desired cracking rate) for desulfurizaticn activity, cracking activity and deterioration rate (degree of raising of reaction temperature).

Cracking rate during 300 days and sulfur content in the residual oil fraction (343° C.+) in the reaction product were as follows.

|  | Sulfur Content in Residual Oil Fraction (343° C. +) | Cracking Rate |
|---|---|---|
| Example 1 | 0.30 wt % | 13 wt % |
| Example 2 | 0.30 wt % | 16 wt % |

COMPARATIVE EXAMPLE 1

Inspections of the catalyst used in Comparative Example 1 are shown in Table 1. This catalyst had a factor P as low as 1.1. Experimental conditions and feed oil were the same as in Examples 1 and 2, and evaluation was carried out similarly. The result is shown in FIG. 1. Since the catalyst used in Comparative Example 1 had a high desulfurization activity at the initial stage of operation, the reaction temperature may be 5° C. lower as compared with the catalysts in Examples 1 and 2 in order to attain the desired desulfurization rate, but it was necessary to react at a standard temperature (360° C.) in order to attain a cracking rate of 12%. Therefore, the sulfur content of the product was at a lower value than one needed for about 50 days (which was a severe condition for the catalyst). Because the catalyst was subject to a severe condition in the initial stage of operation, the required reaction temperature was rapidly raised after about the 240th day and the catalyst had a short catalyst life.

COMPARATIVE EXAMPLE 2

Inspections of the catalyst used in Comparative Example 2 are shown in Table 1. This catalyst had a high factor P which was 8.8. Experimental conditions and feed oil were the same as in Examples 1 and 2, and evaluation was carried cut similarly. The result is shown in FIG. 1.

The catalyst used in Comparative Example 2 had a low desulfurization activity, and a high reaction temperature (standard value +20° C.) was required from the initial stage of operation in order to attain the desired desulfurization rate. Therefore, it reached the restriction temperature range within 200 days or so, as shown in FIG. 1, to result in a short catalyst life.

COMPARATIVE EXAMPLE 3

Inspections of the catalyst used in Comparative Example 3 are shown in Table 1. This catalyst had a factor P of 3.2 which was within the scope of the present invention but had a total pore volume of 0.36 ml/g which was beyond the scope of the present invention. Experimental conditions and feed oil were the same as in Examples 1 and 2, and evaluation was carried out similarly. The result is shown in FIG. 1.

The catalyst used in Comparative Example 3 had a desulfurization activity analogous to the catalyst in Example 1 at the initial stage, and variation of the required reaction temperature was similar to Example 1 until the 200th day, as shown in FIG. 1. However, since the total pore volume of this catalyst was small as compared with the catalyst of Example 1, this catalyst showed rapid deterioration of the catalytic activity after the 200th day, and the reaction temperature reached the restriction temperature range after 250 days to result in a short catalyst life.

TABLE 1

|  | Example 1 | Example 2 | Comparative Example 1 | Comparative Example 2 | Comparative Example 3 |
|---|---|---|---|---|---|
| Catalyst | A | B | C | D | E |
| Carrier | Alumina | Alumina | Alumina | Alumina | Alumina |
| Supported metal (wt %) | | | | | |
| NiO | 4.8 | 5.3 | 5.2 | 4.1 | 5.1 |
| MoO$_3$ | 15.2 | 15.1 | 15.1 | 12.5 | 15.3 |
| Surface area (m$^2$/g) | 229 | 134 | 250 | 130 | 158 |
| Total pore volume (ml/g) | 0.57 | 0.58 | 0.53 | 0.69 | 0.36 |
| Average pore diameter ($\overline{PD}$) (Å) | 84 | 120 | 57 | 159 | 79 |
| Proportion of $\overline{PD} \pm 5$ Å (S) (%) | 28 | 34 | 52 | 18 | 25 |
| Factor P | 3.0 | 3.5 | 1.1 | 8.8 | 3.2 |
| Proportion of $\overline{PD} + 10$ Å − $\overline{PD} + 500$ Å (%)* | 13 | 14 | 4 | 21 | 15 |

Note:
*Proportion of volume of pores in a range of $\overline{PD} + 10$ Å to $\overline{PD} + 500$ Å based on the total pore volume.

TABLE 2

| Feed Oil | Atmospheric Pressure Distillation Residual Oil of Arabian Light Crude oil |
|---|---|
| Specific Gravity (15/4° C.) | 0.9472 |
| Sulfur Content (wt %) | 2.97 |
| Kinetic Viscosity (50° C., cSt) | 138.6 |
| Conradson Carbon Residue (wt %) | 7.88 |
| Asphaltene Content (wt %) | 1.89 |
| Metal Content (wppm) | 23 |
| Residual Oil Fraction Boiling above 343° C. (wt %) | 92.2 |

REFERENCE EXAMPLE 1

Previous to the long-term life test of Examples 1 and 2 and Comparative Examples 1 to 3, the inventors had developed the test method for evaluating catalyst life wherein test results could be obtained in a short term.

In this test, experimental conditions of Examples 1 and 2 and Comparative Examples 1 to 3 were adopted except that the liquid hourly space velocity was 0.6 hr$^{-1}$, which was higher than that of Examples 1 and 2 and Comparative Examples 1 to 3, and the temperature was 370° to 420° C., which was also higher than that of Examples 1 and 2 and Comparative Examples 1 to 3. The feed oil was the same as in Examples 1 and 2 and Comparative Examples 1 to 3. As the reaction process in this test, a process was adopted wherein reduction of catalytic activity was compensated for by raising the reaction temperature so that the sulfur content of the residual oil fraction boiling above 343° C. (650° F.) (343° C.+) in the reaction product was 0.3% by weight or less and the cracking rate, i.e., the reduction rate of the residual oil fraction (343° C.+) in the feed oil by hydrocracking, was 10% by weight or more. The restriction temperature, which was the critical operating temperature in the laboratory-scale reactor in this experiment, was 410° C.

Under the above experimental conditions, the evaluation of catalysts whose results were substantially equal to those of the long-term life test could be done after the lapse of about 50 days.

The inventors have already confirmed that catalysts with which the reaction operation could be carried out during at least 50 days at not more than the restriction temperature under the above experimental conditions have the desired desulfurization activity, cracking activity, and deterioration rate.

Figure 2:
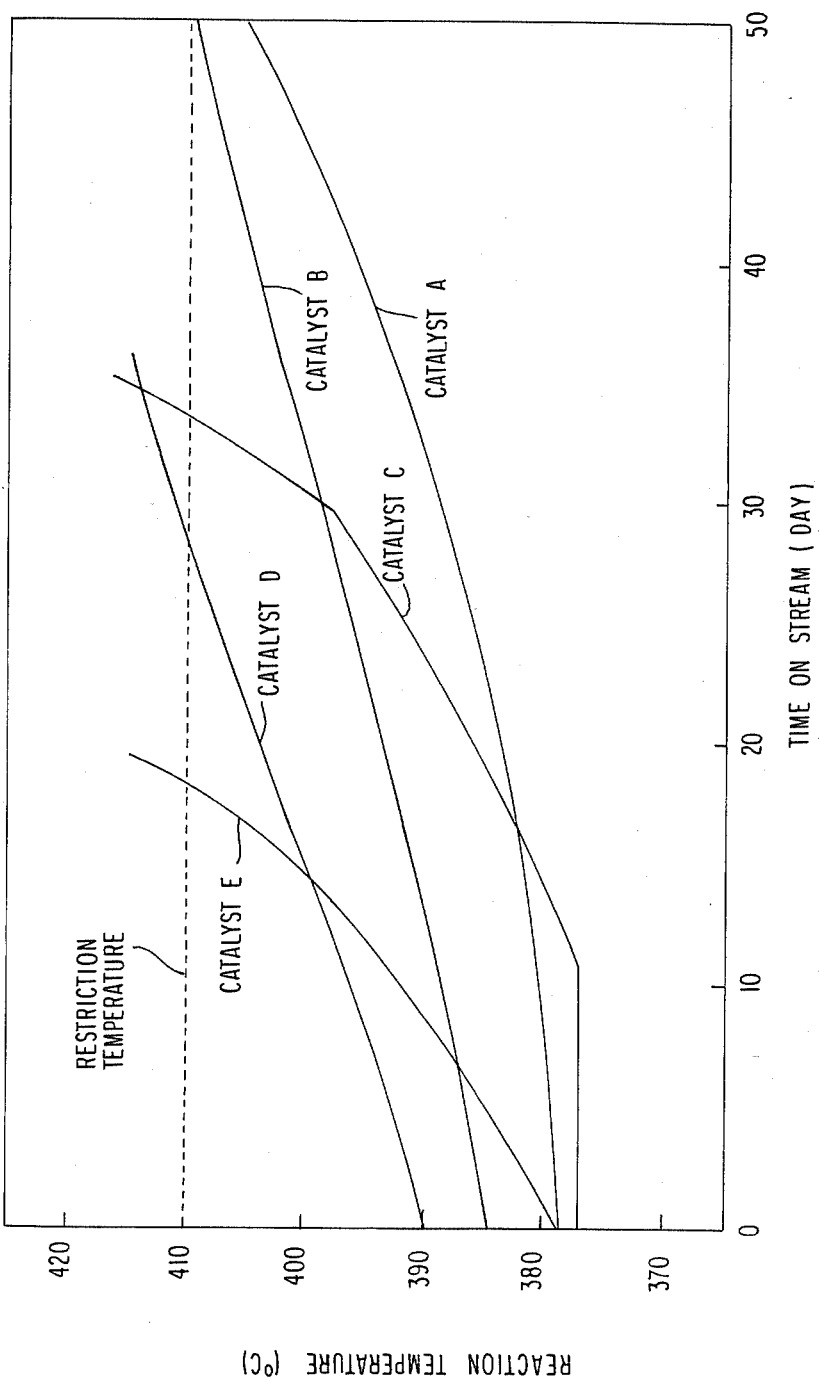

The short-term life test results for Catalysts A and B used in Examples 1 and 2, respectively, according to the present invention and Catalysts C, D and E used in Comparative Examples 1 to 3, respectively, for comparison are shown in FIG. 2.

It is apparent from FIG. 2 that by using Catalysts A and B of the present invention the reaction operation can be stably carried out at not more than the restriction temperature, and these catalysts suffice to provide the desired desulfurization activity, cracking activity and deterioration rate at the same time, whereby these two catalysts are in accord with the present invention. On the other hand, Catalysts C, D, and E, which are outside of the scope of the invention, do not suffice to provide any of the desired desulfurization activity, cracking activity, and deterioration rate, and reach the restriction temperature during rather short terms, each of which is much less than 50 days. Though the sequence of the catalyst lives is slightly different from that of FIG. 1, Catalysts C, D, and E are all clearly outside of the present invention.

While the invention has been described in detail and with reference to specific embodiments thereof, it will be apparent to one skilled in the art that various changes and modifications can be made therein without departing from the spirit and scope thereof.

What is claimed is:

1. A hydrogen treating catalyst consisting essentially of alumina, 3 to 7% by weight of nickel calculating as NiO and 10 to 20% by weight of molybdenum calculating as MoO$_3$, which has a total pore volume of 0.55 to 1.0 ml/g, an average pore diameter of 50 to 250 Å, and factor P of 3 to 4, wherein the volume of pores having a diameter of larger than the average pore diameter +10 Å and smaller than the average pore diameter +500 Å is 10 to 30% of the total pore volume in catalyst pore distribution, wherein the factor P is represented by the following formula:

$$P = \overline{PD}/S$$

wherein $\overline{PD}$ represents an average pore diameter measured by a mercury porosimeter which is the pore diameter (Å) corresponding to the pressure at which ½ of the total pore volume is saturated with mercury, and S represents a proportion (%) of volume of pores in a range of $\overline{PD} \pm 5$ Å based on the total pore volume.

2. A hydrogen treating catalyst according to claim 1, which is used for hydrogen treating of heavy mineral oil.

3. A hydrogen treating catalyst according to claim 1, which consists essentially of alumina, 3 to 7% by weight of nickel calculating as NiO and 10 to 20% by weight of molybdenum calculating as $MoO_3$.

4. A hydrogen treating catalyst according to claim 1, which consists essentially of alumina, 3.5 to 6% by weight of nickel calculating as NiO and 11 to 17% by weight of molybdenum calculating as $MoO_3$.

5. A hydrogen treating catalyst according to claim 1, wherein the total pore volume is 0.55 to 0.75 ml/g.

6. A hydrogen treating catalyst according to claim 1, wherein the average pore diameter is 50 to 220 Å.

7. A hydrogen treating catalyst according to claim 1, wherein the average pore diameter is 50 to 200 Å.

8. A hydrogen treating catalyst according to claim 1, wherein the factor P is 3.0 to 3.8.

9. A hydrogen treating catalyst according to claim 1, wherein the volume of pores having a diameter of larger than the average pore diameter +10 Å and smaller than the average pore diameter +500 Å is 10 to 25% of the total pore volume.

10. A hydrogen treating catalyst according to claim 1, wherein the volume of pores having a diameter of larger than the average pore diameter +10 Å and smaller than the average pore diameter +500 Å is 10 to 20% of the total pore volume.

11. A hydrogen treating catalyst according to claim 1, which consists essentially of alumina, 3.5 to 6% by weight of nickel calculating as NiO and 11 to 17% by weight of molybdenum calculating as $MoO_3$, and has a total pore volume of 0.55 to 0.75, an average pore diameter of 50 to 220 Å and factor P of 3.0 to 3.8, wherein the volume of pores having a diameter of larger than the average pore diameter +10 Å and smaller than the average pore diameter +500 Å is 10 to 25% of the total pore volume.

* * * * *